United States Patent
Enomoto et al.

(10) Patent No.: US 11,242,084 B2
(45) Date of Patent: Feb. 8, 2022

(54) STEERING APPARATUS

(71) Applicant: HITACHI AUTOMOTIVE SYSTEMS, LTD., Hitachinaka (JP)

(72) Inventors: Masatoshi Enomoto, Sagamihara (JP); Osamu Yoshida, Yokohama (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 79 days.

(21) Appl. No.: 16/636,534

(22) PCT Filed: Jul. 11, 2018

(86) PCT No.: PCT/JP2018/026158
§ 371 (c)(1),
(2) Date: Feb. 4, 2020

(87) PCT Pub. No.: WO2019/031148
PCT Pub. Date: Feb. 14, 2019

(65) Prior Publication Data
US 2020/0247458 A1    Aug. 6, 2020

(30) Foreign Application Priority Data
Aug. 9, 2017  (JP) .............................. JP2017-153793

(51) Int. Cl.
*B62D 3/12* (2006.01)
*F16B 7/04* (2006.01)

(52) U.S. Cl.
CPC .............. *B62D 3/12* (2013.01); *F16B 7/0406* (2013.01)

(58) Field of Classification Search
CPC .......... B62D 3/12; F16B 7/0406; F16B 17/00; F16B 5/02; F16B 43/00; F16B 43/002;
(Continued)

(56) References Cited

U.S. PATENT DOCUMENTS 3,417,652 A * 12/1968 Menge ..................... E04B 1/49
411/466
3,603,197 A *  9/1971 Wood .................. F16B 15/0046
411/468
(Continued)

FOREIGN PATENT DOCUMENTS

DE     19845204 A1 *  4/2000 ................ F16B 5/02
DE     10134809 A1 *  2/2003 .............. F16B 43/00
(Continued)

OTHER PUBLICATIONS

Harunaga et al., 'Machine Translation of WO 2015162952 A1 Obtained Jun. 14, 2021', 2015 (Year: 2015).*
(Continued)

*Primary Examiner* — Paul N Dickson
*Assistant Examiner* — Scott F. Underwood
(74) *Attorney, Agent, or Firm* — Foley & Lardner LLP

(57) ABSTRACT

A steering apparatus includes, at a gear housing, a rack bar containing portion movably containing a rack bar configured to turn a turning target wheel and made from a metallic material, and an engagement protrusion portion provided between a bracket portion and a frame of a vehicle. The bracket portion is provided at the rack bar containing portion. The bracket portion is made from a metallic material. The bracket portion includes a cylindrical portion. The bracket portion is coupled with the frame of the vehicle made from a metallic material. The engagement protrusion portion is made from a metallic material having a higher degree of hardness than the metallic material of the bracket portion and the metallic material of the frame of the vehicle, and protrudes toward a vehicle frame side on which the frame of the vehicle is located. The engagement protrusion portion abuts against a plastically deformable portion of the frame of the vehicle with the bracket portion and the frame (Continued)

of the vehicle coupled with each other with use of a coupling member.

9 Claims, 9 Drawing Sheets

(58) Field of Classification Search
CPC .......... F16B 43/02; F16B 29/00; F16B 4/004; F16B 11/002; Y10T 403/49; Y10T 403/4958
USPC .......................................................... 411/531
See application file for complete search history.

(56) References Cited

U.S. PATENT DOCUMENTS

| | | | | |
|---|---|---|---|---|
| 3,703,304 A | * | 11/1972 | Losee | ................ F16B 15/0046 411/462 |
| 3,841,195 A | * | 10/1974 | Jureit | ................ F16B 15/0046 411/459 |
| 3,910,153 A | * | 10/1975 | Jureit | ................ F16B 15/0046 411/466 |
| 3,951,033 A | * | 4/1976 | Moehlenpah | ....... F16B 15/0046 411/468 |
| 4,165,672 A | * | 8/1979 | Jureit | ................ F16B 15/0046 411/461 |
| 5,527,404 A | * | 6/1996 | Warren | .................... C22F 1/05 148/688 |
| 5,833,421 A | * | 11/1998 | Lees | ................... F16B 15/0046 411/466 |
| 6,601,361 B2 | | 8/2003 | Seibert | ................. E04B 1/7608 403/283 |
| 7,306,418 B2 | * | 12/2007 | Kornblum | ............. F16B 35/065 411/160 |
| 8,492,004 B2 | * | 7/2013 | Watanabe | ............... F16B 43/00 428/609 |
| 8,920,089 B1 | * | 12/2014 | Stewart | ................. F16B 5/0258 411/352 |
| 2007/0006444 A1 | * | 1/2007 | Makimae | .................. F16B 5/02 29/525.01 |

FOREIGN PATENT DOCUMENTS

| | | | | |
|---|---|---|---|---|
| DE | 102015212814 A1 | * | 1/2017 | ............. F16B 2/005 |
| DE | 102019205524 A1 | * | 10/2020 | ............. B62D 3/12 |
| FR | 2877864 A1 | * | 5/2006 | ............. B21D 53/24 |
| GB | 1391811 A | * | 4/1975 | ......... F16B 15/0046 |
| GB | 2415025 A | | 12/2005 | |
| JP | S51-057918 A | | 5/1976 | |
| JP | H11-247831 A | | 9/1999 | |
| JP | 2003-261040 A | | 9/2003 | |
| JP | 2006-22948 A | | 1/2006 | |
| JP | 2006-273172 A | | 10/2006 | |
| JP | 2007203880 A | * | 8/2007 | ............... F16B 5/02 |
| JP | 2011-225031 A | | 11/2011 | |
| JP | 2015199448 A | * | 11/2015 | |
| JP | 2016124500 A | * | 7/2016 | |
| KR | 20180050090 A | * | 5/2018 | |
| WO | WO-2015162952 A1 | * | 10/2015 | ............... B62D 3/12 |
| WO | WO-2019031148 A1 | * | 2/2019 | ............... F16B 5/02 |

OTHER PUBLICATIONS

International Search Report issued in corresponding application No. PCT/JP2018/026158 dated Oct. 9, 2018 with English translation.
Written Opinion issued in corresponding application No. PCT/JP2018/026158 dated Oct. 9, 2018 with English translation.

* cited by examiner

STEERING APPARATUS

TECHNICAL FIELD

The present invention relates to a steering apparatus mounted on a vehicle body.

BACKGROUND ART

PTL 1 discloses a technique that fixes a steering apparatus by inserting a bolt penetrating through a cylindrical collar fixed to the steering apparatus into a cross member, which is a vehicle body-side member, and tightening this bolt to the cross member.

CITATION LIST

Patent Literature

[PTL 1] Japanese Patent Application Public Disclosure No. 2003-261040

SUMMARY OF INVENTION

Technical Problem

The above-described patent literature, PTL 1 involves such a problem that a bush is provided between an inner cylinder and an outer cylinder forming the collar, which means that the steering apparatus is fixed to the vehicle body side via the bush, thereby reducing a steering rigidity.

The present invention has been made in consideration of the above-described problem, and an object thereof is to provide a steering apparatus capable of ensuring the steering rigidity.

Solution to Problem

According to one aspect of the present invention, a steering apparatus includes, at a gear housing, a rack bar containing portion movably containing a rack bar configured to turn a turning target wheel and made from a metallic material, and an engagement protrusion portion provided between a bracket portion and a frame of a vehicle. The bracket portion is provided at the rack bar containing portion. The bracket portion is made from a metallic material. The bracket portion includes a cylindrical portion. The bracket portion is coupled with the frame of the vehicle made from a metallic material. The engagement protrusion portion is made from a metallic material having a higher degree of hardness than the metallic material of the bracket portion and the metallic material of the frame of the vehicle, and protrudes toward a vehicle frame side on which the frame of the vehicle is located. The engagement protrusion portion abuts against a plastically deformable portion of the frame of the vehicle with the bracket portion and the frame of the vehicle coupled with each other with use of a coupling member.

According to the steering apparatus according to the one aspect of the present invention, the engagement protrusion portion bites into the frame of the vehicle and plastically deforms a part of the frame of the vehicle, by which rattling can be prevented between the gear housing and the frame of the vehicle in a radial direction.

DESCRIPTION OF EMBODIMENTS

First Embodiment

Figure 1:
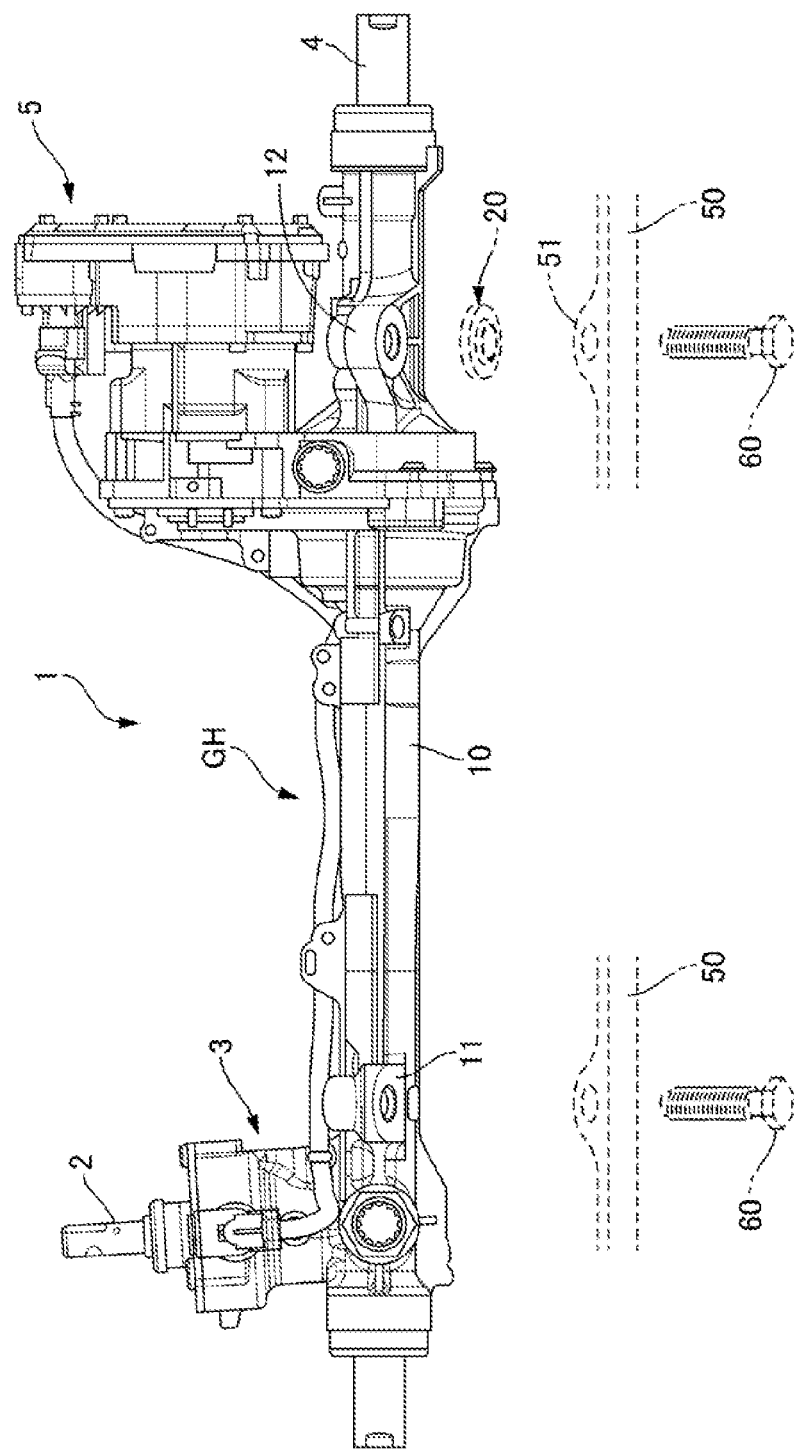
FIG. 1 is a front view of a steering apparatus according to a first embodiment.

FIG. 1 is a front view of a steering apparatus. The steering apparatus 1 includes a rack bar 4 and an assist mechanism 5. The rack bar 4 turns a turning target wheel. The assist mechanism 5 provides an assist force to the rack bar 4. The steering apparatus 1 includes a gear housing GS, which contains a steering mechanism 3 and the assist mechanism 5 and is made from an aluminum alloy. The steering mechanism 3 converts a rotational motion of a pinion shaft 2, which rotates integrally with a steering wheel, into an axial motion of the rack bar 4. The assist mechanism 5 calculates the assist force according to a running state and a steering state of a driver, and provides the assist force to the rack bar 4 with use of an electric motor.

The gear housing GS includes a tubular rack bar containing portion 10, a first bracket portion 11, and a second bracket portion 12. The rack bar containing portion 10 movably contains the rack bar 4. The first bracket portion 11 is disposed close to the steering mechanism 3, and protrudes radially outward from the rack bar containing portion 10. The second bracket portion 12 is disposed close to the assist mechanism 5, and protrudes radially outward from the rack bar containing portion 10. The second bracket portion 12 includes a cylindrical portion 120, which extends in a direction approximately perpendicular to a movement direction of the rack bar 4. The second bracket portion 12 includes, on an inner periphery of the cylindrical portion 120, a nut portion 121 with a female screw portion formed thereon. Then, the second bracket portion 12 is threadably enraged with a screw 60 with a male screw portion formed thereon. The second bracket portion 12 according to the first embodiment is formed integrally with the gear housing GS by casting. An annular member 20 is provided between the second bracket portion 12 and a frame 50. Further, the second bracket portion 12 includes an annular member containing recessed portion 122 on an end surface of the cylindrical portion 120 on the holding frame 50 side. An insertion portion 24 that is a part of the annular member 20, which will be described below, is inserted in the annular member containing recessed portion 122. A fixation bracket 51 is formed on the frame 50 of the vehicle, which is made from a metallic material. The fixation bracket 51 includes a through-hole 51a.

Figure 2:
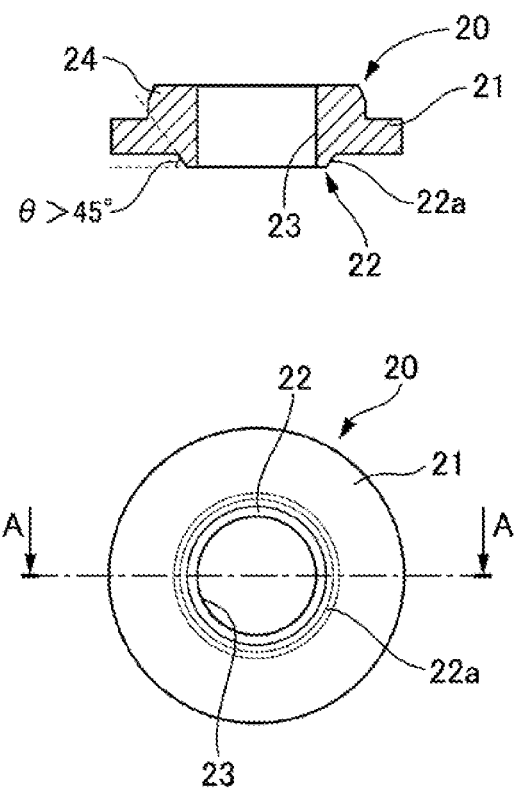
FIG. 2 is a front view and a cross-sectional view of an annular member according to the first embodiment.

FIG. 2 is a front view and a cross-sectional view of the annular member according to the first embodiment. The annular member 20 includes the insertion portion 24, a flange portion 21, and an annular engagement protrusion portion 22. The insertion portion 24 includes a through-hole 23 through which a bolt 60 is inserted. The flange portion 21 increases in diameter on an outer peripheral side of the insertion portion 24. The engagement protrusion portion 22 protrudes from an end surface of the flange portion 21 toward the frame 50 side, and has a tapered shape in cross section. The engagement protrusion portion 22 includes an inclined portion 22a having an outer shape circular in cross section perpendicular to a direction in which the screw 60 is inserted into the cylindrical member, and gradually reducing in diameter of the circular outer shape from the second bracket 12 side toward the vehicle frame 50 side in the direction in which the screw 60 is inserted. The inclined portion 22a extends in parallel with the direction in which the screw 60 is inserted, and forms an angle larger than 45 degrees as a minor angle among relative angles between an axis passing through a center of the through-hole 51a in cross section perpendicular to the direction in which the screw 60 is inserted and an outer peripheral surface of the inclined portion 22a. This configuration can ensure a biting engagement effect of the engagement protrusion portion 22.

The annular member 20 is made from a metallic material having a higher degree of hardness than the metallic material of the second bracket portion 12 and the metallic material of the frame 50 of the vehicle. The annular member 20 is formed in such a manner that a protrusion height protruding from the end surface of the flange portion 21 of the insertion portion 24 toward the steering apparatus 1 side is lower than the depth of the annular member containing recessed portion 122 formed on the second bracket portion 12. In other words, the annular member 20 is positioned due to abutment between the flange portion 21 and an end surface 123.

Figure 3:
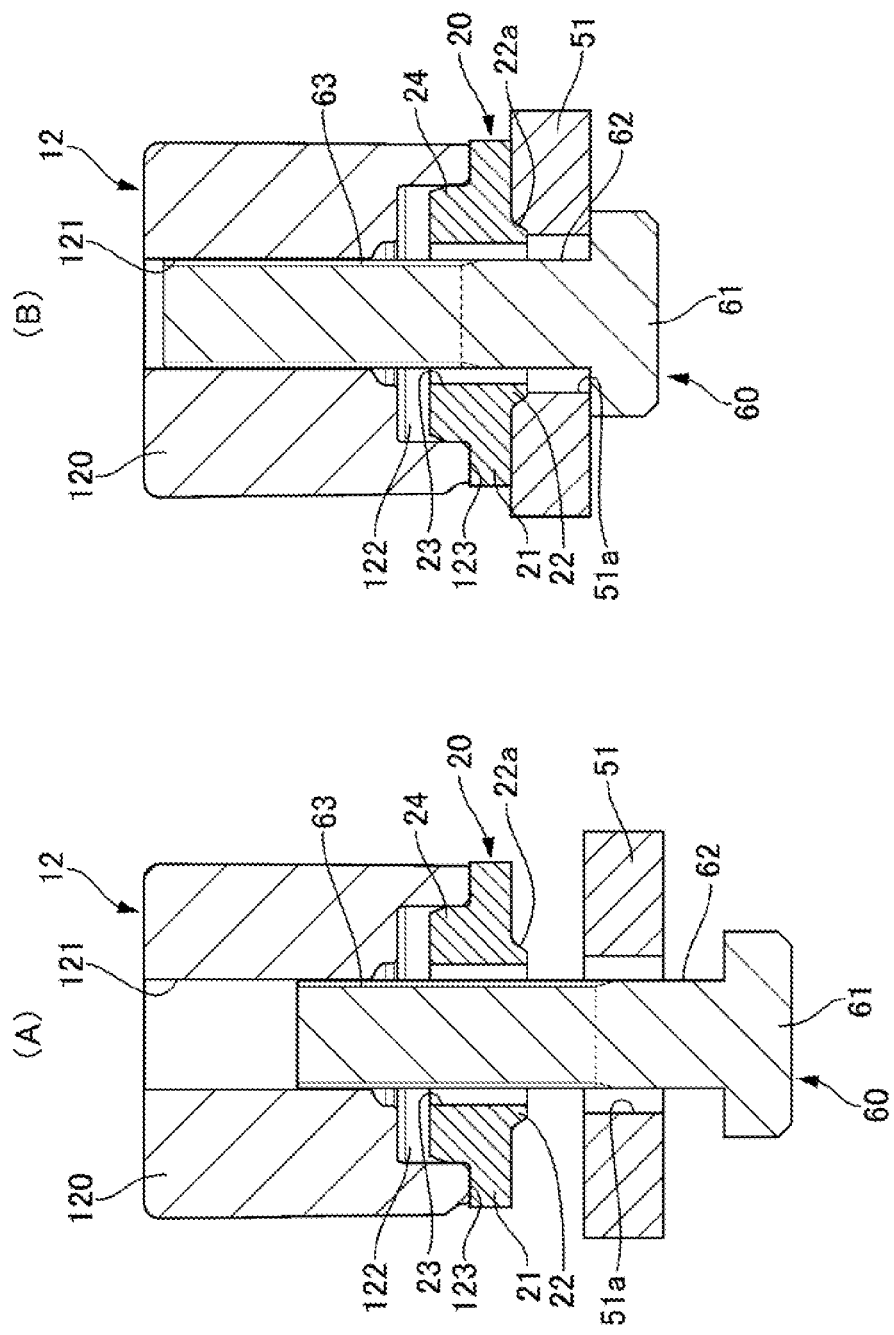
FIGS. 3(A) and 3(B) are schematic cross-sectional views illustrating a function of the annular member according to the first embodiment.

FIGS. 3(A) and 3(B) are schematic cross-sectional views illustrating a function of the annular member according to the first embodiment. FIG. 3(A) illustrates a state before the screw 60 is tightened, and FIG. 3B illustrates a state after the screw 60 is tightened. As illustrated in FIG. 3(A), when the steering apparatus 1 is being mounted on the frame 50 of the vehicle body, the hole positions of the through-hole 51a of the fixation bracket 51 and the nut portion 121 of the second bracket portion 12 are aligned with each other, and the fixation bracket 51 and the second bracket portion 12 are overlaid via the annular member 20 disposed therebetween. At this time, the annular member 20 is positioned due to insertion of the insertion portion 24 into the annular member containing recessed portion 122 and abutment between the end surface of the flange portion 21 and the end surface 123 of the second bracket portion 12 on the frame 50 side. Now, the abutment surface for the positioning should satisfy comparatively high dimensional accuracy, but the provision of the abutment surface of the second bracket portion 12 on the end surface 123 facilitates surface processing of the abutment surface.

The engagement protrusion portion 22 is disposed in such a manner that a distal end thereof abuts against a portion surrounding the through-hole 51a. A space as wide as the height of the engagement protrusion portion 22 is formed between an end surface of the fixation bracket 51 and an end surface of the flange portion 21 of the annular member 20. A region surrounding this through-hole 51a and in abutment with the distal end of the engagement protrusion portion 22 serves as a plastically deformable portion.

Next, as illustrated in FIG. 3B, the screw 60 is inserted into the through-holes 51a and 23 from the frame 50 side, and is tightened to the nut portion 121. This causes the engagement protrusion portion 22 to plastically deform a circumferential edge of the through-hole 51a and bite into the fixation bracket 51 of the frame 50, thereby eliminating the space. When the tightening of the screw 60 is completed, the plastic deformation of the circumferential edge of the through-hole 51a causes the fixation bracket 51 to position the engagement protrusion portion 22 from the outer peripheral side and fix the steering apparatus 1 to the frame 50. In other words, the engagement protrusion portion 22 bites into the frame 50 of the vehicle, and plastically deforms a part of the frame 50 of the vehicle. As a result, the steering apparatus 1 can prevent rattling between the gear housing GS and the frame 50 of the vehicle in a radial direction (a radial direction with respect to a rotational axis of the screw 60). In other words, the steering apparatus 1 can increase a steering rigidity because achieving the positioning with the aid of the plastic deformation of the metal without use of a bush or the like interposed between the gear housing and the frame like the conventional technique.

In the above-described manner, the first embodiment can bring about the following advantageous effects.

(1) The steering apparatus 1 includes the rack bar 4 configured to turn the turning target wheel, the gear housing GS including the rack bar containing portion 10 and the second bracket portion 12, and the engagement protrusion portion 22 provided between the second bracket portion 12 and the frame 50 of the vehicle that is made from the metallic material. The rack bar containing portion 10 is made from the metallic material and movably contains the rack bar 4. The second bracket portion 12 is made from the metallic material and is provided at the rack bar containing portion 10. The second bracket portion 12 includes the cylindrical portion 120 and is coupled with the frame 50 of the vehicle. The engagement protrusion portion 22 is made from the metallic material having the higher degree of hardness than the metallic material of the second bracket portion 12 and the metallic material of the frame 50 of the vehicle, and protrudes toward the vehicle frame 50 side. The engagement protrusion portion 22 abuts against the plastically deformable portion of the frame 50 of the vehicle with the second bracket portion 12 and the frame 50 of the vehicle coupled with each other with use of the screw 60 (a coupling member).

That is, the engagement protrusion portion 22 bites into the frame 50 of the vehicle and plastically deforms a part of the frame 50 of the vehicle, by which the rattling can be prevented between the gear housing GS and the frame 50 of the vehicle in the radial direction (the radial direction with respect to the rotational axis of the screw 60).

(2) The steering apparatus 1 further includes the annular member 20 provided between the second bracket portion 12 and the frame 50 of the vehicle. The engagement protrusion portion 22 is formed integrally with the annular member 20.

That is, the engagement protrusion portion 22 is provided at the annular member 20, which is a different member from the second bracket portion 12, and this facilitates the formation of the engagement protrusion portion 22 and the second bracket portion 12 from the different metallic materials.

(3) The coupling member is the screw 60 including the male screw portion. The second bracket portion 12 includes the female screw portion coupled with the male screw portion of the screw 60. Therefore, a member coupled with the screw 60 such as a nut does not have to be provided on the opposite side of the second bracket portion 12 from the frame 50 of the vehicle, and therefore the number of components can be reduced.

(4) The annular member 20 includes the insertion portion 24 configured to be inserted in the cylindrical portion 120 and the flange portion 21 provided at the insertion portion 24. The annular member 20 is positioned in the direction in which the screw 60 is inserted due to the abutment of the flange portion 21 with the end surface 123 of the cylindrical portion 120 on the vehicle frame 50 side.

Therefore, although the abutment surface for the positioning should satisfy comparatively high dimensional accuracy, the provision of the abutment surface of the second bracket portion 12 on the end surface 123 of the cylindrical portion 120 facilitates the surface processing of this portion.

(5) The inclined portion 22a is in parallel with the direction in which the screw 60 is inserted. The minor angle among the relative angles between the axis passing through the center of the through-hole 51a in cross section perpendicular to the direction in which the screw 60 is, inserted, and the outer peripheral surface of the inclined portion 22a is larger than 45 degrees. Therefore, the power steering apparatus 1 can sufficiently bring about the biting engagement effect of the engagement protrusion portion 22 into the frame 50 of the vehicle.

(6) The engagement protrusion portion 22 has the circular outer shape in cross section perpendicular to the direction in which the screw 60 is inserted into the cylindrical member 120. The engagement protrusion portion 22 also includes the inclined portion 22a where the diameter of the circular outer shape gradually reduces from the second bracket 12 side toward the vehicle frame 50 side in the direction in which the screw 60 is inserted. Therefore, the engagement protrusion portion 22 has the same shape as an intermediate portion of a circular cone (a portion with a tip thereof removed), by which the annular member 20 can be positioned relative to the frame 50 of the vehicle with improved accuracy with the aid of this wedge effect.

(7) The annular member 20 is the cast product. The engagement protrusion portion 22 may include a poured portion poured in the second bracket portion 12. As a result, the second bracket portion 12 and the engagement protrusion portion 22 can be coupled with each other with an enhanced force.

The gear housing GS and the second bracket portion 12 are integrally formed by casting with use of the same metallic material as the metallic material of the gear housing GS and the metallic material of the second bracket portion 12 in the first embodiment, but may be formed separately with use of different metallic materials. Further, the screw 60 is used as the coupling member when the steering apparatus 1 is coupled with the frame 50 in the first embodiment, but this coupling member may be a bolt coupled with a nut or may be another coupling member as long as the employed method is capable of generating an axial force. Preferably, it is effective to use such a coupling member that tightening the coupling member causes the engagement protrusion portion 22 and the frame of the vehicle to be pressed against each other and form the plastic deformation portion with the aid of this coupling force. Further, the annular member 20 has been described assuming that the insertion portion 24 is inserted into the annular member containing recessed portion 122 simply, but may be fixed by press-fitting.

Second Embodiment

Figure 4:
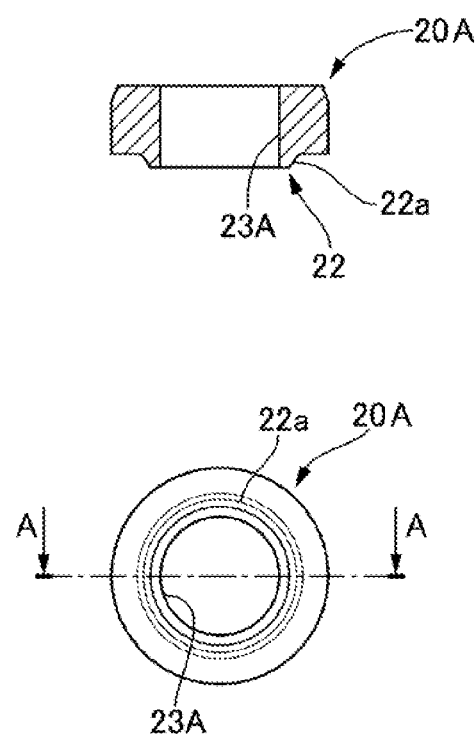
FIG. 4 is a front view and a cross-sectional view of an annular member according to a second embodiment.
Figure 5:
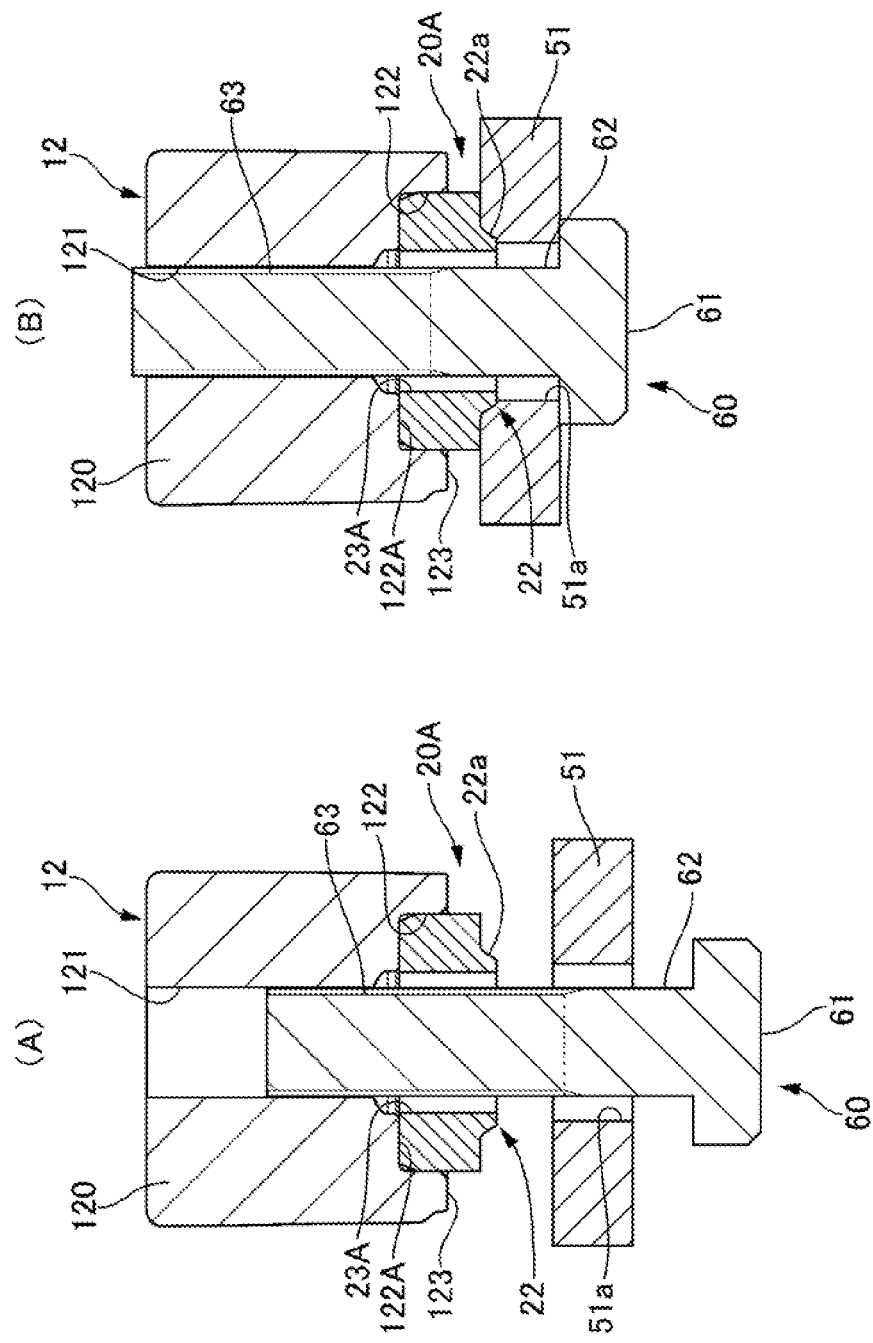
FIGS. 5(A) and 5(B) are schematic cross-sectional views illustrating a function of the annular member according to the second embodiment.

Next, a second embodiment will be described. The second embodiment has a basic configuration similar to the first embodiment, and therefore will be described focusing on only differences therefrom. FIG. 4 is a front view and a cross-sectional view of an annular member according to the second embodiment. The annular member 20 according to the first embodiment includes the flange portion 21. On the other hand, an annular member 20A according to the second embodiment does not include the flange portion 21, which is a difference from the first embodiment. FIGS. 5(A) and 5(B) are schematic cross-sectional views illustrating a function of the annular member according to the second embodiment. FIG. 5(A) illustrates a state before the screw 60 is tightened, and FIG. 5(B) illustrates a state after the screw 60 is tightened. In the first embodiment, the annular member 20 is positioned due to the abutment of the flange portion 21 with the end surface 123. On the other hand, in the second embodiment, as illustrated in FIG. 5(A), the second bracket portion 12 includes the annular member containing recessed portion 122 and an annular member abutment surface 122A on the vehicle frame 50 side of the cylindrical portion 120. The annular member containing recessed portion 122 is opened toward the vehicle frame 50 side, and contains a part of the annular member 20A. The annular member 20A is positioned in the direction in which the screw 60 is inserted by being contained in the annular member containing recessed portion 122 and being also brought into abutment with the annular member abutment surface 122A. Therefore, the annular member 20A can be easily positioned even when being shaped simply without including the flange portion or the like.

(8) The second bracket portion 12 includes the annular member containing recessed portion 122. The annular member containing recessed portion 122 is provided at the end portion of the cylindrical portion 120 on the vehicle frame 50 side, and has the recessed shape opened toward the vehicle frame 50 side. The annular member containing recessed portion 122 contains at least a part of the annular member 20. The annular member containing recessed portion 122 includes the annular member abutment surface 122A in parallel with the cross section perpendicular to the direction in which the screw 60 is inserted into the cylindrical portion 120. The annular member 20 is positioned in the direction in which the screw 60 is inserted due to the abutment of this annular member 20 with the annular member abutment surface 122A. Therefore, the annular member 20 can be simply shaped.

Third Embodiment

Figure 6:
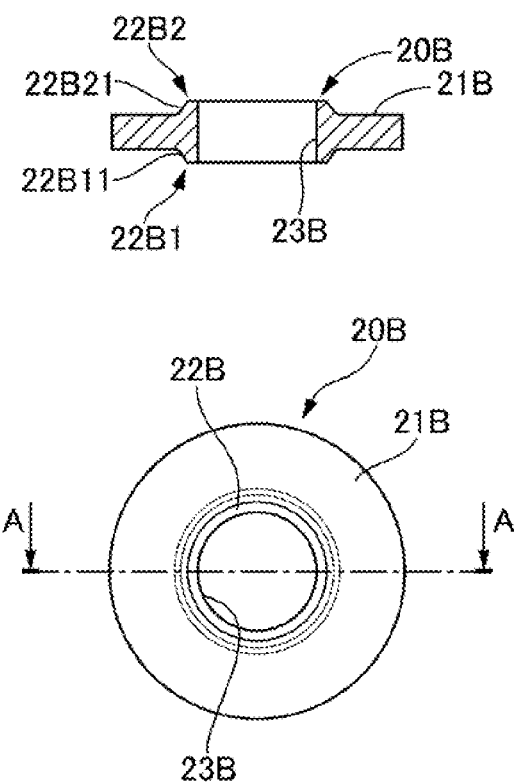
FIG. 6 is a front view and a cross-sectional view of an annular member according to a third embodiment.

Next, a third embodiment will be described. The third embodiment has a basic configuration similar to the first embodiment, and therefore will be described focusing on only differences therefrom. FIG. 6 is a front view and a cross-sectional view of an annular member according to the third embodiment. The annular member 20 according to the first embodiment includes the flange portion 21, and includes the engagement protrusion portion 22 only on the frame 50 side. On the other hand, an annular member 20B according to the third embodiment includes a bracket-side engagement protrusion portion 2B2 protruding from a flange portion 21B toward the second bracket portion 12 side in addition to the flange portion 21B and an engagement protrusion portion 22B1 protruding from this flange portion 21B toward the frame 50 side, which is a difference from the first embodiment.

Figure 8:
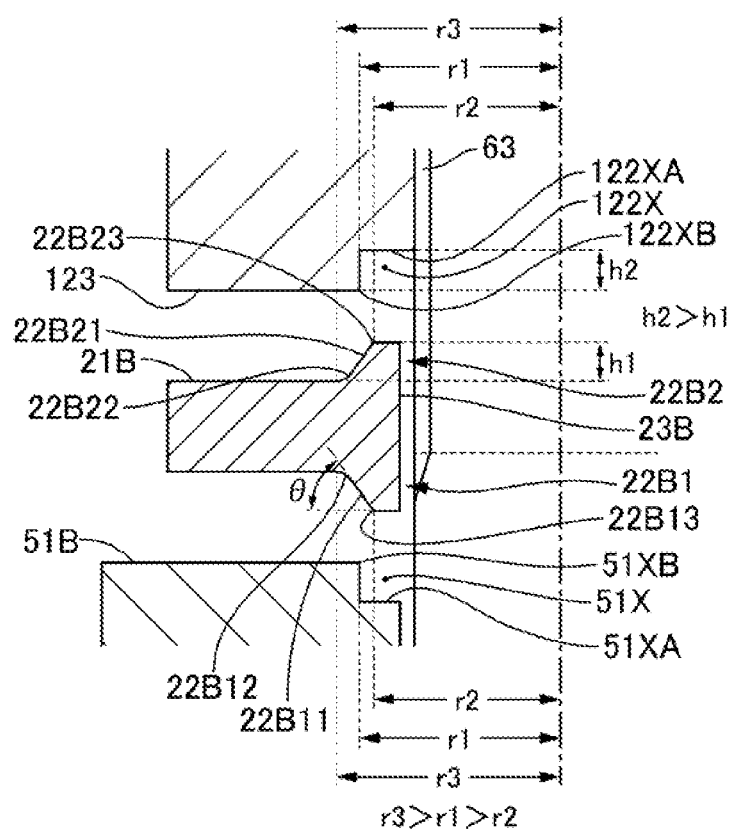
FIG. 8 is a partial enlarged cross-sectional view of the annular member and the vicinity thereof before a plastic deformation according to the third embodiment.

FIG. 8 is a partial enlarged cross-sectional view of the annular member and the vicinity thereof before the plastic deformation according to the third embodiment. The engagement protrusion portion 22B1 and the bracket-side engagement protrusion portion 22B2 of the annular member 20B are formed symmetrically in a direction along a rotational axis of the screw 60. An inclined portion 22B2a of the bracket-side engagement protrusion portion 22B2 is formed at a larger angle than 45 degrees (a minor angle among relative angles between an axis extending in parallel with the direction in which the screw 60 is inserted and passing through the center of the through-hole 51a in cross section perpendicular to the direction in which the screw 60 is inserted (hereinafter referred to as a central axis), and an outer peripheral surface of the inclined portion 22B2a). Similarly, an inclined portion 22B11 of the bracket-side engagement protrusion portion 22B2 is formed at a larger angle than 45 degrees.

On the other hand, a first engagement protrusion portion fitted insertion recessed portion 122X is formed on the end surface of the cylindrical portion 120 on the frame 50 side. The first engagement protrusion portion fitted insertion recessed portion 122X is formed in such a manner that a depth h2 thereof is greater than a height h1 of the engagement protrusion portion 22B1. In other words, h2>h1 is established. Further, the first engagement protrusion portion fitted insertion recessed portion 122X is formed in such a manner that a dimension thereof satisfies r3>r1>r2, assuming that r3 represents a distance between a radially outer-side end portion 22B22 of the inclined portion 22B21 of the bracket-side engagement protrusion portion 22B2 and the central axis, r2 represents a distance between a radially inner-side end portion 22B23 of the inclined portion 22B21 and the central axis, and r1 represents a distance between an outer circumferential edge 122XB of the first engagement protrusion portion fitted insertion recessed portion 122X and the central axis. Similarly, a second engagement protrusion portion fitted insertion recessed portion 51X is formed on the end surface of the fixation bracket 51 on the annular member 20B side. A second engagement protrusion portion fitted insertion recessed portion 51X is formed in such a manner that a depth h2 thereof is greater than a height h1 of the bracket-side engagement protrusion portion 22B2. Further, a distance between an outer peripheral edge 51XB of the second engagement protrusion portion fitted insertion recessed portion 51X and the central axis is also r1, and the second engagement protrusion portion fitted insertion recessed portion 51X is formed in such a manner that a dimension thereof satisfies r3>r1>r2.

Figure 7:
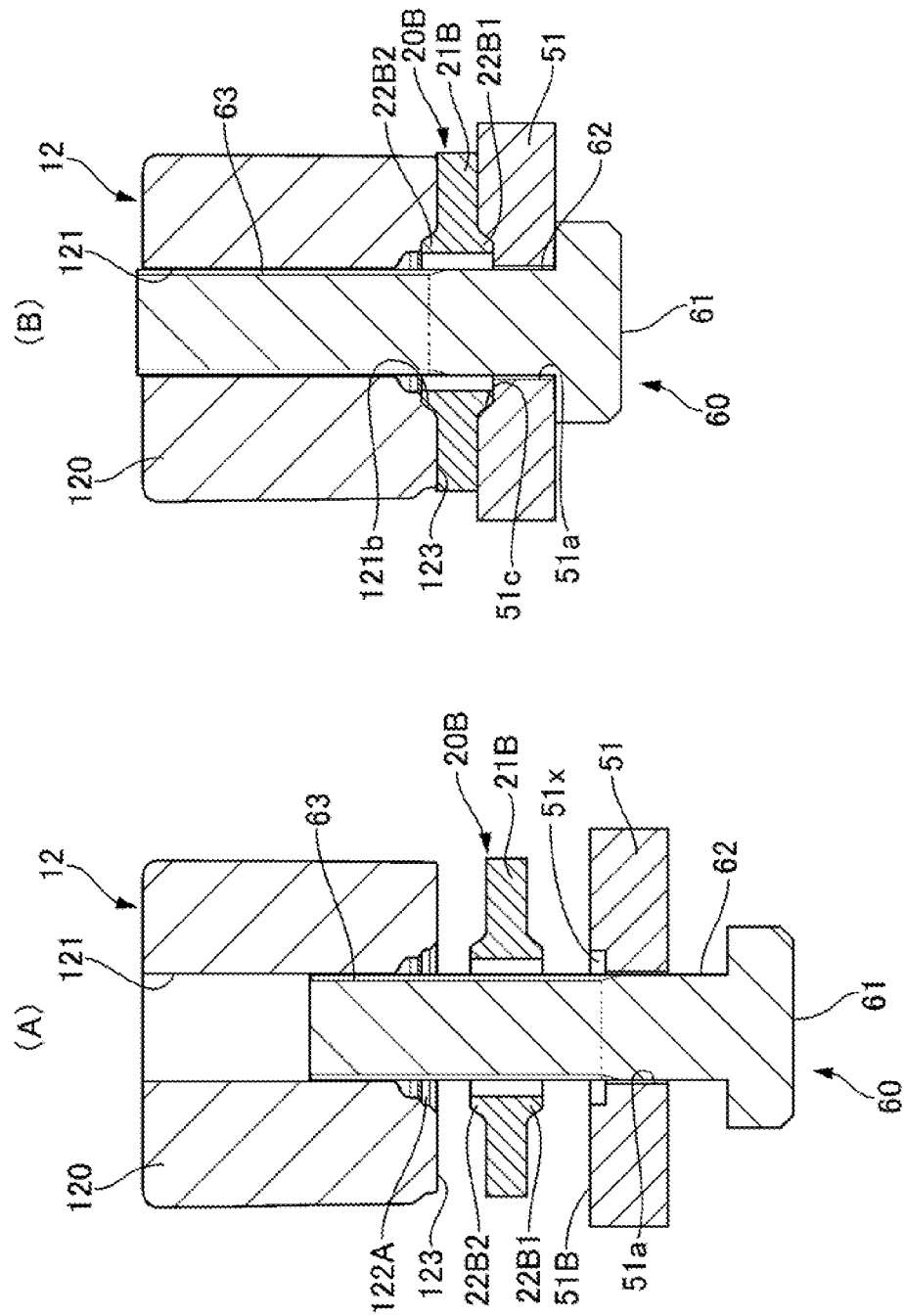
FIGS. 7(A) and 7(B) are schematic cross-sectional views illustrating a function of the annular member according to the third embodiment.

FIGS. 7(A) and 7(B) are schematic cross-sectional views illustrating a function of the annular member according to the third embodiment. FIG. 7(A) illustrates a state before the screw 60 is tightened, and FIG. 7(B) illustrates a state after the screw 60 is tightened. When the steering apparatus 1 is being mounted on the frame 50 of the vehicle body, the hole positions of the through-hole 51a of the fixation bracket 51 and the nut portion 121 of the second bracket portion 12 are aligned with each other, and the fixation bracket 51 and the second bracket portion 12 are overlaid via the annular member 20B disposed therebetween. At this time, the inclined portion 22B21 of the bracket-side engagement protrusion portion 22B2 is brought into abutment with the outer peripheral edge 122XB of the first engagement protrusion portion fitted engagement recessed portion 122X. Further, the inclined portion 22B11 of the engagement protrusion portion 22B1 is brought into abutment with the outer peripheral edge 51XB of the second engagement protrusion portion fitted insertion recessed portion 51X. The annular member 20B is positioned due to the abutment between these inclined portions 22B21 and 22B12 and the outer peripheral edges 122XB and 51XB. At this time, the flange portion 21B is in a state out of contact with both the end surface 123 of the second bracket portion 12 and the end surface 51B of the fixation bracket 51 of the frame 50. The first engagement protrusion portion fitted insertion recessed portion 122X and the second engagement protrusion portion fitted insertion recessed portion 51X correspond to the plastically deformable portion.

Next, as illustrated in FIG. 7(B), the screw 60 is inserted into the through-holes 51a and 23 from the frame 50 side, and is tightened to the nut portion 121. This causes the engagement protrusion portion 22B1 to plastically deform the outer circumferential edge 51XB of the second engagement protrusion portion fitted insertion recessed portion 51X and bite into the fixation bracket 51 of the frame 50, thereby eliminating the space between the engagement protrusion portion 22B1 and the second bracket portion 12. At the same time, the bracket-side engagement protrusion portion 22B2 plastically deforms the outer circumferential edge 122XB of the first engagement protrusion portion fitted insertion recessed portion 122X and bites into the second bracket portion 12, thereby eliminating the space between the bracket-side engagement protrusion portion 22B2 and the fixation bracket 51. At this time, a space formed on the second bracket portion 12 side of the bracket-side engagement protrusion portion 2232 in the central axial direction and a space formed on the frame 50 side of the engagement protrusion portion 22B1 in the direction along the central axis function as a plastically flowing portion containing portion.

Figure 9:
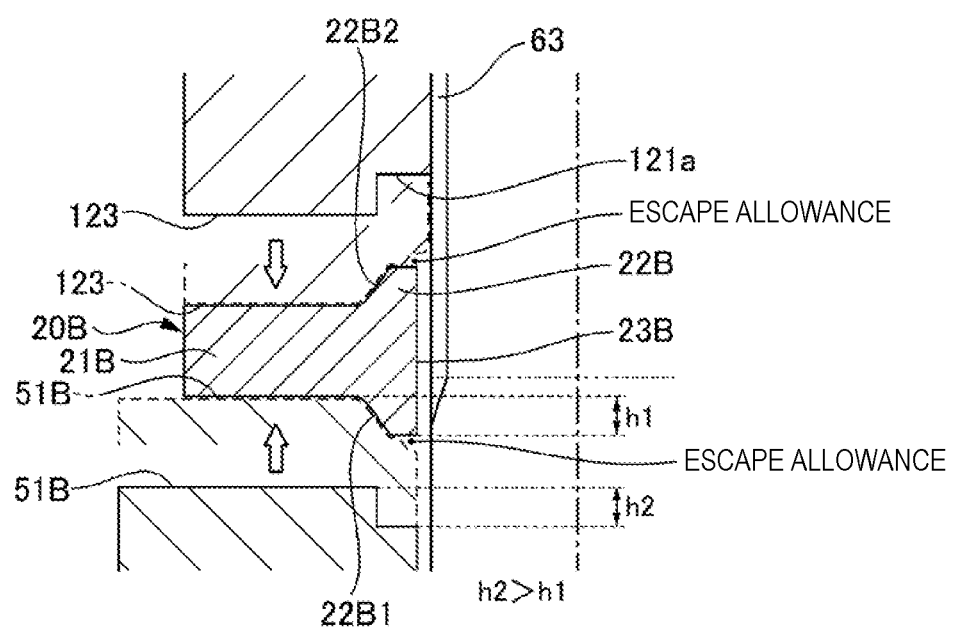
FIG. 9 is a partial enlarged cross-sectional view of the annular member and the vicinity thereof after the plastic deformation according to the third embodiment.

FIG. 9 is a partial enlarged cross-sectional view of the annular member and the vicinity thereof after the plastic deformation according to the third embodiment. When the tightening of the screw 60 is completed, the first engagement protrusion portion fitted insertion recessed portion 122X and the second engagement protrusion portion fitted insertion recessed portion 51X are plastically deformed, by which the fixation bracket 51 positions the engagement protrusion portion 22B1 and the bracket-side engagement protrusion portion 22B2 from the outer peripheral side. Because of h2>h1, a space is formed on the second bracket portion 12 side in the direction along the central axis of the bracket-side engagement protrusion portion 22B2. Similarly, a space is formed on the frame 50 side in the direction along the central axis of the engagement protrusion portion 22B1. Therefore, these spaces function as the plastically flowing portion containing portion, thereby forming an escape allowance into which a member caused to flow due to the plastic deformation flows, and thus allowing the screw 60 to be securely tightened. In other words, if the escape allowance is not prepared, the member caused to flow due to the plastic deformation might impede the reductions in the distances between the annular member 20B and the second bracket portion 12 and the fixation bracket 51, thereby prohibiting the screw 60 from being sufficiently tightened.

Further, the flange portion 21B is positioned from the both sides of the end surfaces 123 and 51B in the direction along the central axis. By this positioning, the steering apparatus 1 is fixed to the frame 50. As a result, the steering apparatus 1 can prevent the rattling between the gear housing GS and the frame 50 of the vehicle in the radial direction (the radial direction with respect to the rotational axis of the screw 60). In other words, the steering apparatus 1 can increase the steering rigidity because achieving the positioning with the aid of the plastic deformation of the metal without use of a bush or the like interposed between the gear housing and the frame like the conventional technique.

(9) The annular member 20B includes the bracket-side engagement protrusion portion 22B2. The bracket-side engagement protrusion portion 22B2 is provided on the opposite side from the engagement protrusion portion 22B1 in the direction in which the screw 60 is inserted, and protrudes toward the second bracket portion 12 side. Therefore, the bracket-side engagement protrusion portion 22B2 bites into the second bracket portion 12 and plastically deforms a part of the second bracket portion 12, by which the rattling can be further prevented between the gear housing GS and the frame 50 of the vehicle in the radial direction.

(10) The second bracket portion 12 includes the first engagement protrusion portion containing recessed portion 122X. The first engagement protrusion portion containing recessed portion 122X is provided at the end portion of the cylindrical portion 120 on the vehicle frame 50 side, and has the recessed shape opened toward the vehicle frame 50 side. The first engagement protrusion portion containing recessed portion 122X includes the plastically deformable portion at the portion where the second bracket portion 12 abuts against the bracket-side engagement protrusion portion 22B2 with the second bracket portion 12 and the frame 50 of the vehicle coupled with each other with use of the screw 60. The first engagement protrusion portion containing recessed portion 122X also includes the plastically flowing portion containing portion containing a part of the second bracket portion 12 caused to plastically flow due to the abutment of the bracket-side engagement protrusion portion 22B2. Therefore, the power steering apparatus 1 includes the escape allowance for the escape of a part of the second bracket portion 12 caused to plastically flow due to the bracket-side engagement protrusion portion 22B2, thereby being able to ensure that the annular member 20B abuts against the second bracket portion 12 and thus improve accuracy of the relative positions of them.

(11) The frame 50 of the vehicle includes the through-hole 51a. A part of the engagement protrusion portion 22B and the screw 60 are inserted in the through-hole 51a. The outer peripheral edge 51XB is formed in such a manner that the cross section thereof perpendicular to the direction in which the screw 60 is inserted has the circular shape having the radius r1. The inclined portion 22B11 is formed in such a manner that the cross section thereof perpendicular to the direction in which the screw 60 is inserted at the end portion on the vehicle frame 50 side in the direction in which the screw 60 is inserted has the circular shape having the radius r2 smaller than the radius r1. The inclined portion 22B11 is formed in such a manner that the cross section thereof perpendicular to the direction in which the screw 60 is inserted at the end portion on the second bracket portion 12 side has the circular shape having the radius r3 larger than the radius r1. Therefore, the power steering apparatus 1 can allow the engagement protrusion portion 22B1 to be easily inserted into the through-hole 51a and ensure that the inclined portion 22B11 exerts the wedge effect. In the first and second embodiments, the positional relationship between the inclined portion and the radius of the through-hole 51a may be set to a similar positional relationship to the outer peripheral edge 51XB according to the third embodiment.

The present invention is not limited to the above-described embodiments, and includes various modifications. For example, the above-described embodiments have been described in detail to facilitate better understanding of the present invention, and the present invention shall not necessarily be limited to the configurations including all of the described features. Further, a part of the configuration of some embodiment can be replaced with the configuration of another embodiment. Further, some embodiment can also be implemented with a configuration of another embodiment added to the configuration of this embodiment. Further, each of the embodiments can also be implemented with another configuration added, deleted, or replaced with respect to a part of the configuration of this embodiment.

The present application claims priority under the Paris Convention to Japanese Patent Application No. 2017-153793 filed on Aug. 9, 2017. The entire disclosure of Japanese Patent Application No. 2017-153793 filed on Aug. 9, 2017 including the specification, the claims, the drawings, and the abstract is incorporated herein by reference in its entirety.

REFERENCE SIGN LIST 1 steering apparatus
2 pinion shaft
3 steering mechanism
4 rack bar
5 assist mechanism
10 rack bar containing portion
11 first bracket portion
12 second bracket portion
20 annular member
20A annular member
20B annular member
21 flange portion
21B flange portion
22 engagement protrusion portion
22a inclined portion
22B engagement protrusion portion
22B1 engagement protrusion portion
22B11 inclined portion
22B2 bracket-side engagement protrusion portion
22B21 inclined portion
22B22 radially outer-side end portion
22B23 radially inner-side end portion
22B2a inclined portion
23 through-hole
24 insertion portion
50 frame
51 fixation bracket
51B end surface
51X second engagement protrusion portion fitted insertion recessed portion
51XB outer circumferential edge
51a through-hole
60 screw
60 bolt
60 screw
120 cylindrical portion
121 nut portion
122 annular member containing recessed portion
122A annular member abutment surface
122X first engagement protrusion portion fitted insertion recessed portion
122XB outer circumferential edge
123 end surface
GS gear housing

The invention claimed is:

1. A steering apparatus comprising:
a rack bar configured to turn a turning target wheel;
a gear housing including a rack bar containing portion and a bracket portion; and an engagement protrusion portion provided between the bracket portion and a frame of the vehicle, the frame being made from a metallic material, wherein the rack bar containing portion is made from a metallic material and movably contains the rack bar, wherein the bracket portion is made from a metallic material and is provided at the rack bar containing portion, wherein the bracket portion includes a cylindrical portion and is coupled with the frame of the vehicle, wherein the engagement protrusion portion is made from a metallic material having a higher degree of hardness than the metallic material of the bracket portion and the metallic material of the frame of the vehicle, and protrudes toward a vehicle frame side on which the frame of the vehicle is located, wherein the engagement protrusion portion abuts against a plastically deformable portion of the frame of the vehicle with the bracket portion and the frame of the vehicle coupled with each other with a coupling member, wherein the steering apparatus further comprises an annular member provided between the bracket portion and the frame of the vehicle, wherein the engagement protrusion portion is formed integrally with the annular member, wherein the annular member includes an insertion portion configured to be inserted in the cylindrical portion, and a flange portion provided at the insertion portion, and wherein the annular member is positioned in a direction in which the coupling member is inserted due to abutment of the flange portion with an end surface of the cylindrical portion on the vehicle frame side.

2. The steering apparatus according to claim 1, wherein the coupling member is a screw including a male screw portion, and wherein the bracket portion includes a female screw portion coupled with the male screw portion of the screw.

3. The steering apparatus according to claim 1, wherein the bracket portion includes an annular member containing recessed portion, wherein the annular member containing recessed portion is provided at an end portion of the cylindrical portion on the vehicle frame side, and has a recessed shape opened toward the vehicle frame side, wherein the annular member containing recessed portion contains at least a part of the annular member, wherein the annular member containing recessed portion includes an annular member abutment surface in parallel with a cross section perpendicular to a direction in which the coupling member is inserted into the cylindrical portion, and wherein the annular member is positioned in the direction in which the coupling member is inserted due to abutment of this annular member with the annular member abutment surface.

4. The steering apparatus according to claim 1, wherein the annular member includes a bracket-side engagement protrusion portion, and wherein the bracket-side engagement protrusion portion is provided on an opposite side from the engagement protrusion portion in the direction in which the coupling member is inserted, and protrudes toward a bracket portion side on which the bracket portion is located.

5. The steering apparatus according to claim 4, wherein the bracket portion includes a bracket-side engagement protrusion portion containing recessed portion, wherein the bracket-side engagement protrusion portion containing recessed portion is provided at an end portion of the cylindrical portion on the vehicle frame side, and has a recessed shape opened toward the vehicle frame side, wherein the bracket-side engagement protrusion portion containing recessed portion includes a plastically deformable portion at a portion where the bracket portion abuts against the bracket-side engagement protrusion portion with the bracket portion and the frame of the vehicle coupled with each other with use of the coupling member, and wherein the bracket-side engagement protrusion portion containing recessed portion also includes a plastically flowing portion containing portion containing a part of the bracket portion caused to plastically flow due to the abutment of the bracket-side engagement protrusion portion with the bracket portion.

6. The steering apparatus according to claim 1, wherein the engagement protrusion portion has a circular outer shape in cross section perpendicular to a direction in which the coupling member is inserted into the cylindrical member, and wherein the engagement protrusion portion also includes an inclined portion where a diameter of the circular outer shape gradually reduces from a bracket side on which the bracket is located toward the vehicle frame side in the direction in which the coupling member is inserted.

7. The steering apparatus according to claim 6, wherein the frame of the vehicle includes a through-hole, wherein a part of the engagement protrusion portion and the coupling member are inserted in the through-hole, wherein the through-hole is formed in such a manner that a cross section thereof perpendicular to the direction in which the coupling member is inserted has a circular shape having a first radius, wherein the inclined portion is formed in such a manner that a cross section thereof perpendicular to the direction in which the coupling member is inserted at an end portion on the vehicle frame side in the direction in which the coupling member is inserted has a circular shape having a second radius smaller than the first radius, and wherein the inclined portion is formed in such a manner that a cross section thereof perpendicular to the direction in which the coupling member is inserted at an end portion on the bracket portion side has a circular shape having a third radius larger than the first radius.

8. The steering apparatus according to claim 6, wherein the inclined portion is in parallel with the direction in which the coupling member is inserted, and wherein a minor angle among relative angles between an axis passing through a center of the through-hole in cross section of the inclined portion that is perpendicular to the direction in which the coupling member is inserted, and an outer peripheral surface of the inclined portion is larger than 45 degrees.

9. The steering apparatus according to claim 1, wherein the bracket portion is a cast product, and wherein the engagement protrusion portion includes a poured portion poured in the bracket portion.

* * * * *